United States Patent
Teramoto

(10) Patent No.: US 11,999,660 B2
(45) Date of Patent: Jun. 4, 2024

(54) CERAMIC JOINED BODY AND METHOD FOR MANUFACTURING SAME

(71) Applicant: KYOCERA Corporation, Kyoto (JP)

(72) Inventor: Kouji Teramoto, Koka (JP)

(73) Assignee: KYOCERA CORPORATION, Kyoto (JP)

( * ) Notice: Subject to any disclaimer, the term of this patent is extended or adjusted under 35 U.S.C. 154(b) by 1134 days.

(21) Appl. No.: 16/643,143

(22) PCT Filed: Aug. 29, 2018

(86) PCT No.: PCT/JP2018/031950
§ 371 (c)(1),
(2) Date: Feb. 28, 2020

(87) PCT Pub. No.: WO2019/044906
PCT Pub. Date: Mar. 7, 2019

(65) Prior Publication Data
US 2020/0346984 A1    Nov. 5, 2020

(30) Foreign Application Priority Data
Aug. 29, 2017   (JP) ................. 2017-163995

(51) Int. Cl.
C04B 37/00      (2006.01)
(52) U.S. Cl.
CPC ...... *C04B 37/003* (2013.01); *C04B 2237/064* (2013.01); *C04B 2237/343* (2013.01); *C04B 2237/765* (2013.01); *C04B 2237/78* (2013.01); *Y10T 428/192* (2015.01)

(58) Field of Classification Search
None
See application file for complete search history.

(56) References Cited

U.S. PATENT DOCUMENTS

2009/0029087 A1    1/2009  Ohashi et al.
2012/0175042 A1*   7/2012  Akash ............. C04B 35/6269
                                                156/89.11

FOREIGN PATENT DOCUMENTS

| JP | 2014-65631 A | 4/2014 |
| JP | 2015-48272 A | 3/2015 |
| KR | 10-2008-0113258 A | 12/2008 |

* cited by examiner

*Primary Examiner* — Alexander S Thomas
(74) *Attorney, Agent, or Firm* — Procopio, Cory, Hargreaves & Savitch LLP

(57) ABSTRACT

A ceramic joined body includes a first aluminum oxide-based sintered body, a second aluminum oxide-based sintered body, an aluminum oxide-based joint layer located between the first aluminum oxide-based sintered body and the second aluminum oxide-based sintered body, and an aluminum oxide-based protrusion connected to the aluminum oxide-based joint layer, where the average diameter for closed pores of the aluminum oxide-based projection is 0.8 times or more and 1.5 times or less as large as the average diameter for closed pores for each of the first aluminum oxide-based sintered body and the second aluminum oxide-based sintered body.

4 Claims, 2 Drawing Sheets

CERAMIC JOINED BODY AND METHOD FOR MANUFACTURING SAME

TECHNICAL FIELD

The present disclosure relates to a ceramic joined body and a method for manufacturing same.

BACKGROUND ART

Ceramic joined bodies obtained by integration of a plurality of ceramic sintered bodies or a plurality of ceramic molded bodies tend to be lower in mechanical strength at the joints than the parts excluding the joints.

Patent Document 1 reports that when a joined body having a joint material interposed between ceramic sintered bodies is subjected to a heat treatment while being applied with a pressure, the porosity ratio of the joint layer between the ceramic sintered bodies can be controlled to 3 to 30%, thus the joined body can be kept from being deformed, and the strength of the joined body is allowed to be controlled in the range of 25 to 80% of the ceramic sintered body.

In addition, Patent Document 2 discloses a technique for joining a plurality of ceramic molded bodies, and reports that a ceramic joined body with a high joint ratio is obtained by providing a groove in the joint region between ceramic molded bodies, allowing slurry to adhere to the joint region, and sintering the ceramic molded bodies.

RELATED ART DOCUMENTS

Patent Documents

Patent Document 1: Japanese Unexamined Patent Publication No. 2014-65631
Patent Document 2: Japanese Unexamined Patent Publication No. 2015-48272

SUMMARY OF THE INVENTION

A ceramic joined body according to the present disclosure includes a first aluminum oxide-based sintered body, a second aluminum oxide-based sintered body, an aluminum oxide-based joint layer located between the first aluminum oxide-based sintered body and the second aluminum oxide-based sintered body, and an aluminum oxide-based protrusion connected to the aluminum oxide-based joint layer, where the average diameter for closed pores of the aluminum oxide-based projection is 0.8 times or more and 1.5 times or less as large as the average diameter for closed pores for each of the first aluminum oxide-based sintered body and the second aluminum oxide-based sintered body.

Furthermore, a method for manufacturing the ceramic joined body according to the present disclosure includes: a step of preparing a first molded body containing a powder mainly containing an aluminum oxide, and a resin, and a second molded body containing a powder mainly containing an aluminum oxide, and a resin; a step of preparing a paste containing a powder mainly containing an aluminum oxide, a cellulose-based polysaccharide, and a solvent; a step of providing the paste on the surface of either the first molded body or the second molded body; a step of providing a composite molded body by combining the first molded body and the second molded body such that the paste protrudes from a joint region between the first molded body and the second molded body; and a step of sintering the composite molded body.

EMBODIMENTS FOR CARRYING OUT THE INVENTION

Hereinafter, an embodiment of the present invention will be described in detail with reference to the drawings. In all of the drawings through this specification, however, the same parts are denoted by the same reference symbols unless there is any confusion, and the description of the parts will be omitted on a timely basis.

Figure 1:
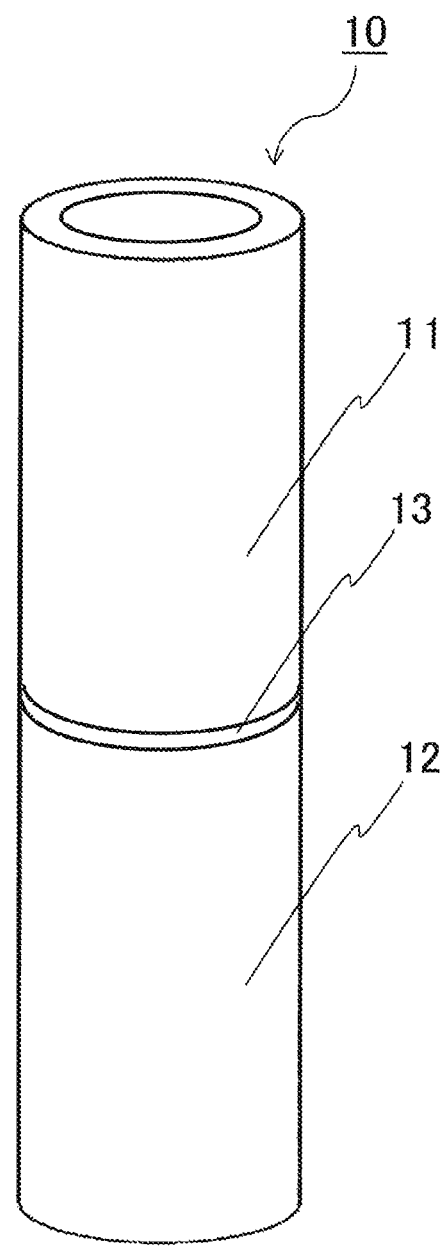
FIG. 1 is a perspective view illustrating an example of a ceramic joined body according to the present embodiment.
Figure 2:
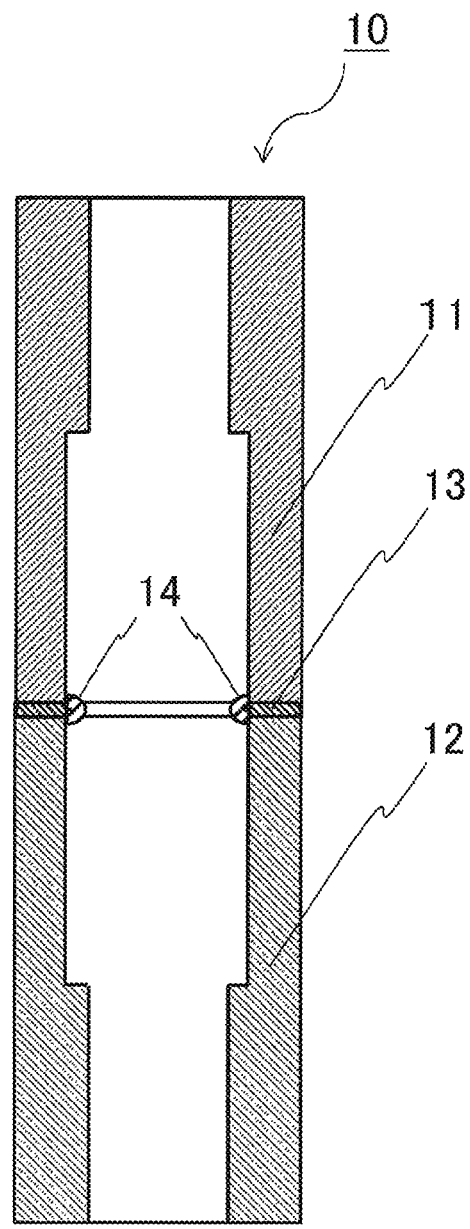
FIG. 2 is a cross-sectional view illustrating an example of a ceramic joined body according to the present embodiment.

FIG. 1 is a perspective view illustrating an example of a ceramic joined body according to the present embodiment, and FIG. 2 is a cross-sectional view illustrating an example of the ceramic joined body according to the present embodiment.

The ceramic joined body 10 shown in FIGS. 1 and 2, which is cylindrical, has a dense first aluminum oxide-based sintered body 11 (hereinafter, the dense first aluminum oxide-based sintered body 11 is referred to as a first sintered body 11), a dense second aluminum oxide-based sintered body 12 (hereinafter, the dense second aluminum oxide-based sintered body 12 is referred to as a second sintered body 12), a dense aluminum oxide-based joint layer 13 (hereinafter, the aluminum oxide-based joint layer 13 is referred to simply as a joint layer 13), which is present between the first sintered body 11 and the second sintered body 12 to integrate the first sintered body 11 and the second sintered body 12, and an aluminum oxide-based protrusion 14 (hereinafter, the aluminum oxide-based protrusion 14 is referred to simply as a protrusion 14) connected to the joint layer 13. The internal space of the ceramic joined body 10 serves as a flow channel for the supply and discharge of a fluid such as a gas for plasma generation, for example.

The gas for plasma generating is, for example, a fluorine-based gas such as $SF_6$, $CF_4$, $CHF_3$, $C_1F_3$, $NF_3$, $C_4F_8$, or HF, or a chlorine-based gas such as $Cl_2$, HCl, $BCl_3$, or $CCl_4$, and the ceramic joined body 10 can be used as a flow channel member.

As shown in FIG. 2, the joint layer 13 is present in a joint region between a joint surface 11a of the first sintered body 11 and a joint surface 12a of the second sintered body 12.

The first sintered body 11, the second sintered body 12, the joint layer 13, and the protrusion 14 are all ceramics mainly containing an aluminum oxide as a main constituent.

In this regard, the main constituent according to the present embodiment refers to a constituent contained in the largest amount, out of 100% by mass of all constituents constituting the ceramic in total, and the constituent is preferably, in particular, 90% by mass or more, furthermore 98% by mass. The respective constituents may be identified with an X-ray diffractometer that uses CuKα rays, and the contents of the respective constituents may be determined by, for example, an ICP (Inductively Coupled Plasma) emission spectroscopic analyzer or a fluorescent X-ray analyzer.

In addition, the denseness according to the present embodiment refers to a state where the area ratio of closed pores in a cross section of each member constituting the ceramic joined body 10 is 8% or less (excluding 0% by area).

The protrusion 14 protruding outside the joint layer 13 is connected to the joint layer 13. In other words, the protrusion 14 is disposed so as to cover at least one of the inner surface and outer surface of the joint layer 13. For the ceramic joined body 10 shown in FIGS. 1 and 2, the protrusion 14 covers the inner peripheral surface which is the inner surface of the joint layer 13.

In general, each member constituting the ceramic joined body 10 is more likely to be broken as fracture origins such as closed pores become larger, and more likely to be broken as the distances between the fracture origins and the surface of the sintered body become smaller. Accordingly, if the sizes of the pores of the protrusion 14, in particular, the closed pores thereof which are present typically more than the open pores, can be reduced, the ceramic joined body 10 is provided which is unlikely to be broken and excellent in reliability.

From such a viewpoint, the ceramic joined body 10 according to the present disclosure is provided such that the average diameter for the closed pores of the protrusion 14 is 0.8 times or more and 1.5 times or less as large as the average diameter for the closed pores for each of the first sintered body 11 and the second sintered body 12.

When the average diameter for the closed pores of the protrusion 14 is significantly different from the average diameter for the closed pores for each of the first sintered body 11 and the second sintered body 12, characteristics such as strength, fracture toughness, and thermal conductivity will be significantly different locally. Thus, the average diameter for the closed pores of the protrusion 14 is adjusted to be 0.8 times or more and 1.5 times or less as large as the average diameter for the closed pores for each of the first sintered body 11 and the second sintered body 12.

When the average diameter for the closed pores of the protrusion 14 is 1.5 times or less as large as the average diameters for the closed pores of the first sintered body 11 and second sintered body 12, the closed pores which serve as fracture origins are not excessively large, and the ceramic joined body 10 can be thus kept from being fractured with the closed pores of the protrusion 14 as base points.

Alternatively, the average diameter for the closed pores of the protrusion 14 may be made smaller than the average diameter for the closed pores for each of the first sintered body 11 and the second sintered body 12. Such a configuration makes it possible to make the mechanical strength of the protrusion 14 higher than the mechanical strength of the first sintered body 11 and second sintered body 12.

In addition, the ceramic joined body 10 may have a region where the absolute value of the skewness Sk of the distance between the centroids of the closed pores of the protrusion 14 is smaller than the absolute value of the skewness Sk of the distance between the centroids for each of the first sintered body 11 and the second sintered body 12.

With such a configuration, the distribution of the distance between the centroids of the closed pores of the protrusion 14 is brought closer to the normal distribution than the distribution of the distance between the centroids for each of the first sintered body 11 and the second sintered body 12, thus reducing the variation in residual stress in the protrusion 14, and then improving the reliability.

It is to be noted that the distance between the centroids of the closed pores according to the present disclosure refers to a linear distance connecting the centroids of adjacent closed pores.

In addition, the skewness Sk is an index (statistic) indicating how much the distribution is distorted from the normal distribution, that is, the left-right symmetry of the distribution, and in the case of skewness Sk>0, the skirt of the distribution is directed to the right side, in the case of skewness Sk=0, the distribution is a symmetric normal distribution, and in the case of skewness Sk<0, the skirt of the distribution is directed to the left side.

The skewness Sk of the distance between the centroids of the closed pores may be determined with the use of a function SKEW provided in Excel (registered trademark, Microsoft Corporation).

Furthermore, the value obtained by subtracting the average diameter for the closed pores of the protrusion 14 from the average value for the distances between the centroids of the closed pores of the protrusion 14 may be 0.4 times or more as large as the value obtained by subtracting the average diameter for the closed pores of the first sintered body 11 from the average value for the distances between the centroids of the closed pores of the first sintered body 11, and may be 0.4 times or more as large as the value obtained by subtracting the average diameter for the closed pores of the second sintered body 12 from the average value for the distances between the centroids of the closed pores of the second sintered body 12.

The value obtained by subtracting the average diameter for the closed pores of the protrusion 14 from the average value for the distances between the centroids of the closed pores of the protrusion 14 can be rephrased as the average value for the intervals between adjacent closed pores in the protrusion 14. A wider interval means that adjacent closed pores are less likely to communicate with each other.

With such a configuration, the interval between adjacent closed pores in the protrusion 14 is wide, thus making the closed pores less likely to communicate with each other even if heating and cooling are repeated, and thus making it possible to maintain the mechanical strength of the protrusion 14.

Furthermore, the value obtained by subtracting the average value for the closed pores of the protrusion 14 from the average value for the distances between the centroids of the closed pores of the protrusion 14 may be 5 μm or more and 15 μm or less. When this value is 5 μm or more, the closed pores are less likely to communicate with each other even if heating and cooling are repeated, thereby making it possible to maintain the mechanical strength of the protrusion 14, and making the fluid less likely to leak from the internal space to the external space. In addition, when the distance is 15 μm or less, the interval between adjacent closed pores is narrow, thus even if cracks are generated, increasing the probability that development of the cracks will be blocked, and thus reducing that the protrusion 14 will be partially lost.

Furthermore, the skewness Sk of the equivalent circle diameter for the closed pores of the protrusion 14 may be larger than the skewness Sk of the distance between the centroids of the closed pores of the protrusion 14.

With such a configuration, the distribution of the interval between adjacent closed pores in the protrusion 14 is biased in the positive direction, thus making the closed pores less likely to communicate with each other even if heating and cooling are repeated, and thus making it possible to maintain the mechanical strength of the protrusion 14.

The skewness Sk of the equivalent circle diameter of the closed pore may be also determined with the use of a function SKEW provided in Excel (registered trademark, Microsoft Corporation).

Furthermore, the average value for the circularity of the closed pores of the protrusion 14 may be 0.78 or more. When the average value for the circularity of the closed pores of the protrusion 14 falls within this range, the shapes of the closed pores are closer to a spherical shape, stress concentration near the closed pores is less likely to be generated, and the mechanical strength can be thus maintained.

The area ratio of the closed pores of the protrusion 14 of the ceramic joined body 10 according to the present disclosure may be 2% by area or less, and the maximum diameter of the closed pores of the protrusion 14 may be 5 μm or less. When the area ratio and maximum diameter of the closed pores of the protrusion 14 fall within the above-described ranges, the closed pores which serve as fracture origins become smaller, and thus the ceramic joined body 10 is less likely to be broken.

In addition, in order to make the ceramic joined body 10 less likely to be broken, the area ratio of the closed pores of the protrusion 14 may be 1.5% by area or less. In addition, in order to make the ceramic joined body 10 less likely to be broken, the maximum diameter of the closed pores of the protrusion 14 may be 4 μm or less and 3 μm or less.

Furthermore, the average diameter for the closed pores of the protrusion 14 may be 1.5 μm or less. When the average diameter for the closed pores falls within this range, the closed pores which serve as fracture origins are small, and thus, the mechanical strength and the rigidity can be increased.

Furthermore, the ratio between the maximum diameter of the closed pores of the protrusion 14 and the average diameter for the closed pores of the protrusion 14 (the maximum diameter of the closed pores/the average diameter for the closed pores) may be 3 or less. (When the maximum diameter of the closed pores/the average diameter for the closed pores fall within this range, because there is no abnormally large closed pore, the closed pores are less likely to communicate with each other even if heating and cooling are repeated, thereby making it possible to maintain the mechanical strength of the protrusion 14, and making the fluid less likely to leak from the internal space to the external space.

Furthermore, the maximum height of the protrusion 14 (in the example shown in FIG. 2, the maximum height in the normal direction from the inner surface of the joint layer 13) is, for example, 400 μm or more and 650 μm or less. The thickness of the joint layer 13 is, for example, 0.7 mm or more and 1.3 mm or less.

Furthermore, the surface of the protrusion 14 may be curved. When the surface of the protrusion 14 is curved, stress concentration is less likely to occur than in a case where the exposed surface has corners, and the mechanical strength can be thus maintained.

The average diameter for, the maximum diameter of, the area ratio of, the distance between the centroids of, and the circularity of the closed pores for each member are measured by the following methods.

First, cross sections of the first sintered body 11, the second sintered body 12 and the protrusion 14 are subjected to mirror finishing, and for the cross section of each member, an observational range of, for example, 256 μm in horizontal length and 192 μm in vertical length is set at 500-fold magnification with the use of a scanning electron microscope.

With this observational range as an observation object, an approach of particle analysis with image analysis software "A-zou-kun (Ver 2.52)" (registered trademark, manufactured by Asahi Kasei Engineering Corporation, hereinafter referred to simply as image analysis software) can be applied to determine the average diameter for, maximum diameter of, area ratio of, and circularity of closed pores. It is to be noted that the average diameter for the closed pores is the average value for the equivalent circle diameters, and the maximum diameter of the closed pores is the maximum value of the equivalent circle diameters.

Furthermore, the average value for the distance between the centroids of the closed pores can be determined by applying an approach of image analysis, referred to as an inter-centroid distance method.

For the analysis, as the conditions for setting the particle analysis and the inter-centroid distance method, the particle brightness is set to darkness, the binarization method is set to a manual mode, the threshold value is set to 70 to 100, the small figure removal area is 0.3 μm$^2$, and the noise removal filter is set to Yes.

Further, in the measurement described above, the threshold value is set to 70 to 100, but the threshold value may be adjusted depending on the brightness of the image in the observational range, and with the particle brightness set to darkness, the binarization method set to manual, the small figure removal area set to 0.3 μm$^2$, and the noise removal filter set to Yes, the threshold value may be adjusted such that a marker appearing in the image matches the closed pore shape.

Next, a method for manufacturing the ceramic joined body according to the present disclosure will be described.

The method for manufacturing the ceramic joined body according to the present disclosure includes: a step of preparing a first molded body containing a powder mainly containing an aluminum oxide, and a resin, and a second molded body containing a powder mainly containing an aluminum oxide, and a resin; a step of preparing a paste containing a powder mainly containing an aluminum oxide, a cellulose-based polysaccharide, and a solvent; a step of providing the paste on the surface of either the first molded body or the second molded body; a step of providing a composite molded body by combining the first molded body and the second molded body such that the paste protrudes from a joint region between the first molded body and the second molded body; and a step of sintering the composite molded body.

In this regard, the main constituent in the powder refers to a 90% by mass or more constituent of 100% by mass of the powder in total. Water may be preferably used for the solvent. Alternatively, an organic solvent such as ethanol may be used.

Next, the paste is dried by adjusting the humidity at normal temperature, and then holding the humidity for 12 hours or longer and 48 hours or shorter. Thereafter, a ceramic joined body can be obtained by sintering the composite molded body kept at a temperature of 1500° C. or higher and 1700° C. or lower for 5 hours or longer and 8 hours or shorter in the air atmosphere.

The first molded body in the composite molded body is turned into the first sintered body after the sintering, and the second molded body is turned into the second sintered body after the sintering. The paste interposed between the first molded body and the second molded body is turned into a joint layer after the sintering, and the paste oozing out from between the first molded body and the second molded body is turned into a protrusion after the sintering.

Accordingly, how to prepare the paste is important, and the type of a binder for molding is important.

First, a method for manufacturing the first molded body and the second molded body will be described.

A mixed powder weighed so as to provide a powder of: 0.3% by mass of a magnesium hydroxide in terms of oxide (MgO); 0.04% by mass of a silicon oxide; 0.02% by mass of a calcium carbonate in terms of oxide (CaO); and the balance composed of an aluminum oxide is put into a rotating mill together with a solvent such as water, and mixed with ceramic balls made of an aluminum oxide with a purity of 99.5% or more and 99.99% or less.

Next, a binder for molding, such as a polyvinyl alcohol, a polyethylene glycol, or an acrylic resin is added, and then mixed to obtain slurry. In this regard, the additive amount of the binder for molding is 2 parts by mass or more and 10 parts by mass or less in total with respect to 100 parts by mass of the mixed powder.

Next, granulated granules are obtained by spray-drying the slurry with the use of a spray dryer. The first molded body is obtained by a CIP method with the granules, for example, at a pressure of 80 MPa or more and 100 MPa or less. Furthermore, the second molded body is obtained by the same method.

Next, the method for manufacturing the paste will be described.

To the mixed powder described in the method for manufacturing the molded body, a solvent such as water is added so as to meet mixed powder:solvent=55 to 60:40 to 45 on a volume ratio basis, such that the total of the solvent and the mixed powder is 100 parts by mass. To the 100 parts by mass, 8 parts by mass or more and 20 parts by mass or less of a cellulose-based polysaccharide is added, and the mixture is put in a storage container in a stirring device, and mixed and stirred to obtain a paste.

In this regard, the cellulose-based polysaccharide is, for example, at least any of methyl cellulose, ethyl cellulose, ethyl methyl cellulose, hydroxymethyl cellulose, hydroxypropyl methyl cellulose, hydroxyethyl methyl cellulose, carboxymethyl cellulose, carboxymethyl ethyl cellulose, and carboxyethyl cellulose.

In this regard, in order to obtain a ceramic joined body in which the average diameter for closed pores of the protrusion is 0.8 times or more and 1.5 times or less as large as the average diameter for closed pores of the first sintered body and second sintered body, the rotation speed of the stirring device is preferably adjusted to 1200 rpm or more and 1600 rpm or less, and the rotation time is preferably adjusted to 5 minutes or longer and 15 minutes or shorter.

Furthermore, in order to obtain a ceramic joined body in which the average diameter for the closed pores of the protrusion is smaller than the average diameter of the closed pores for each of the first sintered body and the second sintered body, the rotational speed may be increased to 1400 rpm or more and 1600 rpm or less, and the rotation time may be 5 minutes or longer and 15 minutes or shorter.

Furthermore, in order to obtain a ceramic joined body in which the value obtained by subtracting the average diameter for the closed pores of the protrusion from the average value for the distances between the centroids of the closed pores of the protrusion is 0.4 times or more as large as the value obtained by subtracting the average diameter for the closed pores of the first sintered body from the average value for the distances between the centroids of the closed pores of the first sintered body, after the foregoing stirring, further, stirring may be performed by rotation for 2 minutes or longer and 5 minutes or shorter, with the rotation speed and the revolution speed both adjusted to 800 rpm or more and 1200 rpm or less by allowing the storage container to rotate and revolve at the same time. The same method as described above may be used, also in the case of obtaining a ceramic joined body in which the value obtained by subtracting the average diameter for the closed pores of the protrusion from the average value for the distances between the centroids of the closed pores of the protrusion is 0.4 times or more as large as the value obtained by subtracting the average diameter for the closed pores of the second sintered body from the average value for the distances between the centroids of the closed pores of the second sintered body.

Furthermore, in order to obtain a ceramic joined body in which the average value for the circularity of the closed pores of the protrusion is 0.78 µm or more, the rotation speed and the revolution speed may be both adjusted to 1000 rpm or more and 1200 rpm or less.

Then, after applying the paste mentioned above to at least any of the opposed surfaces of the first molded body and the second molded body, with the opposed surfaces facing each other, the first molded body and the second molded body are subjected to pressure, for example, with a pressure of 20 kPa or more and 40 kPa or less, thereby providing a composite molded body with a precursor for the protrusion.

Next, the paste is dried by holding the humidity for 12 hours or longer and 48 hours or shorter while adjusting the humidity at normal temperature. Thereafter, a ceramic joined body can be obtained by sintering the composite molded body kept at a temperature of 1500° C. or higher and 1700° C. or lower for 5 hours or longer and 8 hours or shorter in the air atmosphere. As described above, the ceramic joined body according to the present disclosure is excellent in reliability, and can be thus used for, other than a cylindrical flow channel member that supplies and discharges a fluid such as a gas for plasma generation, an annular channel member, a flow channel member formed in a cylindrical shape, an annular shape, or the like, which supplies and discharges a fluid for cooling, such as argon, helium, water, a shower plate including a large number of flow channels in the thickness direction, and the like.

EXAMPLE

First, the mixed powder weighed so as to provide a powder of: 0.3% by mass of a magnesium hydroxide in terms of oxide (MgO); 0.04% by mass of a silicon oxide; 0.02% by mass of a calcium carbonate in terms of oxide (CaO); and the balance composed of an aluminum oxide was put into a rotating mill together with water, and mixed with ceramic balls made of an aluminum oxide with a purity of 99.8%

Next, as a binder for molding, a polyvinyl alcohol, a polyethylene glycol, and an acrylic resin was added to the solvent, and then mixed to obtain slurry. In this regard, the additive amount of the binder for molding was adjusted to 3 parts by mass in total with respect to 100 parts by mass of the mixed powder.

Next, granulated granules were obtained by spray-drying the slurry with the use of a spray dryer. The granules were molded by a CIP method with a pressure of 30 kPa to obtain a prismatic first molded body as a precursor for the first sintered body. Furthermore, a prismatic second molded body as a precursor for the second sintered body was obtained by the same method.

Next, 19 parts by mass of a cellulose-based polysaccharide was added to 100 parts by mass in total of the above-described mixed powder and water as a solvent at a volume ratio of 57:43, and the mixture was put in a storage container in a stirring device, and mixed and stirred under the condition shown in Table 1, thereby providing a paste.

In addition, as a comparative example, 19 parts by mass of an acrylic binder was added without using any cellulose-based polysaccharide, and the mixture was mixed and stirred under the condition shown in Table 1, thereby preparing a comparative paste.

It is to be noted that in Table 1, the term of rotation (first time) means that the storage container was rotated in the stirring device to perform mixing and stirring. In addition, in Table 1, the term of "rotation-revolution" means that after the rotation (first time), the storage container was further rotated and revolved in the stirring device to perform mixing and stirring. The rotation and the revolution had the same speed in the rotation-revolution.

Then, after applying each paste prepared under the condition shown in Table 1 to the opposed surface of the second molded body, with the opposed surfaces facing each other, the first molded body and the second molded body were subjected to pressure with a pressure of 96 MPa, thereby providing a composite molded body with the paste protruded from the joint region between the first molded body and the second molded body.

Next, the paste was dried while being held at room temperature for 30 hours. Thereafter, the composite molded body was subjected to sintering by holding the body at 1600° C. for 5 hours in the air atmosphere, thereby providing samples Nos. 1 to 10 as ceramic joined bodies.

Test pieces were prepared respectively from the samples Nos. 1 to 10, and subjected to measurement of the three-point bending strength in accordance with JIS R 1601: 2008. It is to be noted that although the deflective surfaces were subjected to only chamfering, without any grinding and polishing, and the measurement was made with the burned surface as a defective surface.

It is to be noted that the test pieces were all disposed such that the joint layers were located in the centers in the longitudinal direction.

In addition, after setting SEM observational ranges of horizontal length: 256 μm and vertical length: 192 μm for respective mirror surfaces of the first sintered body, second sintered body, and joint layer, obtained by polishing cross sections parallel to the thickness direction of the test piece with diamond abrasive grains, the particle analysis of image analysis software and the inter-centroid distance method were applied to measure closed pores and the like as shown in Table 1.

It is to be noted that the average diameter of the closed pores of the sintered body, shown in Table 1, refers to the average diameters for the closed pores included in the first sintered body and the second sintered body. The measurement result is that the closed pores included in the first sintered body and the second sintered body have the same average diameters, and thus shown with an omission.

In addition, the ratio of the distance between the closed pores, shown in Table 1, refers to, with an omission, the ratios between the value obtained by subtracting the average diameter for the closed pores of the protrusion from the average value for the distances between the centroids of the closed pores of the protrusion, and the value obtained by subtracting the average diameter for the closed pores of the first sintered body from the average value for the distances between the centroids of the closed pores of the first sintered body and the value obtained by subtracting the average diameter for the closed pores of the second sintered body from the average value for the distances between the centroids of the closed pores of the second sintered body.

The first sintered body and the second sintered body also have the same ratio of the distance between the closed pores, and the ratio is thus shown with an omission.

TABLE 1

| Sample No. | Additive Type | Rotation (First time) Speed (rpm) | Rotation (First time) Time (minute) | Rotation · Revolution Speed (rpm) | Rotation · Revolution Time (minute) | Average diameter of closed pore (μm) Sintered body | Average diameter of closed pore (μm) Protrusion | Magnification of average diameter of closed pore | Ratio of distance between closed pores (x) | Average value for the circularity for the closed pores of the protrusion | Three-point bending strength (MPa) |
|---|---|---|---|---|---|---|---|---|---|---|---|
| 1 | Acrylic binder | 1300 | 5 | — | — | 1.0 | 1.7 | 1.7 | 0.3 | 0.75 | 320 |
| 2 | Acrylic binder | 1300 | 5 | 1200 | 3 | 1.0 | 1.6 | 1.6 | 0.3 | 0.75 | 330 |
| 3 | Methyl cellulose | 1200 | 5 | — | — | 1.0 | 1.5 | 1.5 | 0.3 | 0.75 | 370 |
| 4 | Methyl cellulose | 1300 | 5 | — | — | 1.0 | 1.2 | 1.2 | 0.3 | 0.75 | 376 |
| 5 | Methyl cellulose | 1500 | 5 | — | — | 1.0 | 0.9 | 0.9 | 0.3 | 0.75 | 380 |
| 6 | Methyl cellulose | 1500 | 5 | 800 | 3 | 1.0 | 0.9 | 0.9 | 0.4 | 0.76 | 382 |
| 7 | Methyl cellulose | 1500 | 5 | 900 | 3 | 1.0 | 0.9 | 0.9 | 0.6 | 0.77 | 390 |
| 8 | Methyl cellulose | 1500 | 5 | 1000 | 3 | 1.0 | 0.9 | 0.9 | 0.6 | 0.78 | 395 |
| 9 | Methyl cellulose | 1500 | 5 | 1100 | 3 | 1.0 | 0.9 | 0.9 | 0.6 | 0.79 | 397 |
| 10 | Methyl cellulose | 1500 | 5 | 1200 | 3 | 1.0 | 0.9 | 0.9 | 0.6 | 0.79 | 397 |
| 11 | Methyl cellulose | 1600 | 5 | — | — | 1.0 | 0.8 | 0.8 | 0.3 | 0.75 | 399 |

As shown in Table 1, in the samples Nos. 1 and 2 obtained with the use of the comparative paste prepared by adding the acrylic binder, the average diameter for the closed pores of the protrusion is more than 1.5 times as large as the average diameter for the closed pores of the first sintered body and the second sintered body, and the samples are fractured from the protrusions, and low in strength as compared to the other samples.

On the other hand, the samples Nos. 3 to 11 in which the average diameter for the closed pores of the protrusion is 0.8 times or more and 1.5 times or less as large as the average diameter for the closed pores of the first sintered body and second sintered body show higher strength than the samples Nos. 1 and 2.

In particular, the samples Nos. 5 to 11 in which the average diameter for the closed pores of the protrusion is smaller than the average diameter for the closed pores of the first sintered body and second sintered body are high in strength.

Furthermore, the samples Nos. 6 to 10 are found to have a tendency to show higher strength, when the value obtained by subtracting the average diameter for the closed pores of the protrusion from the average value for the distances between the centroids of the closed pores of the protrusion is larger than the value obtained by subtracting the average diameter for the closed pores of the sintered body from the average value for the distances between the centroids of the closed pores of the sintered body.

In addition, the samples Nos. 6 to 10 have a tendency to show higher strength, as the average value for the circularity for the closed pores of the protrusion is increased.

DESCRIPTION OF THE REFERENCE NUMERAL

10: Ceramic joined body
11: First sintered body
12: Second sintered body
13: Joint layer
14: Protrusion

The invention claimed is:

1. A ceramic joined body comprising a first aluminum oxide-based sintered body, a second aluminum oxide-based sintered body, an aluminum oxide-based joint layer located between the first aluminum oxide-based sintered body and the second aluminum oxide-based sintered body, and an aluminum oxide-based protrusion connected to the aluminum oxide-based joint layer,
wherein an average diameter for closed pores of the aluminum oxide-based projection is 0.8 times or more and 1.5 times or less as large as an average diameter for closed pores for each of the first aluminum oxide-based sintered body and the second aluminum oxide-based sintered body,
wherein the average diameter for the closed pores of the aluminum oxide-based protrusion is smaller than the average diameter for the closed pores for each of the first aluminum oxide-based sintered body and the second aluminum oxide-based sintered body.

2. A ceramic joined body comprising a first aluminum oxide-based sintered body, a second aluminum oxide-based sintered body, an aluminum oxide-based joint layer located between the first aluminum oxide-based sintered body and the second aluminum oxide-based sintered body, and an aluminum oxide-based protrusion connected to the aluminum oxide-based joint layer,
wherein an average diameter for closed pores of the aluminum oxide-based projection is 0.8 times or more and 1.5 times or less as large as an average diameter for closed pores for each of the first aluminum oxide-based sintered body and the second aluminum oxide-based sintered body, and
wherein the ceramic joined body comprises a region where an absolute value of skewness Sk of a distance between centroids of the closed pores of the aluminum oxide-based protrusion is smaller than an absolute value of skewness Sk of a distance between centroids for each of the first aluminum oxide-based sintered body and the second aluminum oxide-based sintered body.

3. A ceramic joined body comprising a first aluminum oxide-based sintered body, a second aluminum oxide-based sintered body, an aluminum oxide-based joint layer located between the first aluminum oxide-based sintered body and the second aluminum oxide-based sintered body, and an aluminum oxide-based protrusion connected to the aluminum oxide-based joint layer,
wherein an average diameter for closed pores of the aluminum oxide-based projection is 0.8 times or more and 1.5 times or less as large as an average diameter for closed pores for each of the first aluminum oxide-based sintered body and the second aluminum oxide-based sintered body, and
wherein skewness Sk of an equivalent circle diameter for the closed pores of the aluminum oxide-based protrusion is larger than the skewness Sk of the distance between the centroids of the closed pores of the aluminum oxide-based protrusion.

4. A ceramic joined body comprising a first aluminum oxide-based sintered body, a second aluminum oxide-based sintered body, an aluminum oxide-based joint layer located between the first aluminum oxide-based sintered body and the second aluminum oxide-based sintered body, and an aluminum oxide-based protrusion connected to the aluminum oxide-based joint layer,
wherein an average diameter for closed pores of the aluminum oxide-based projection is 0.8 times or more and 1.5 times or less as large as an average diameter for closed pores for each of the first aluminum oxide-based sintered body and the second aluminum oxide-based sintered body, and
wherein an average value for circularity of the closed pores of the aluminum oxide-based protrusion is 0.78 or more.

* * * * *